May 4, 1948.　　C. M. KEARNS, JR., ET AL　　2,440,956
VIBRATION DAMPENING MEANS FOR MULTI-BLADE AIRCRAFT PROPELLERS
Filed Sept. 21, 1945
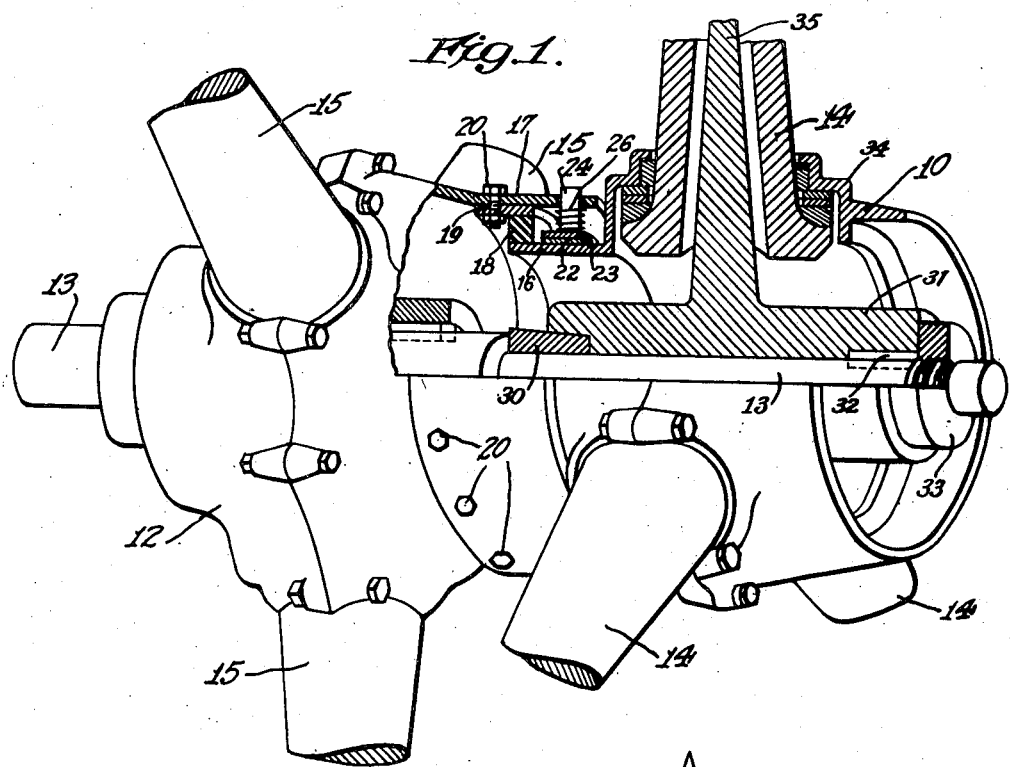
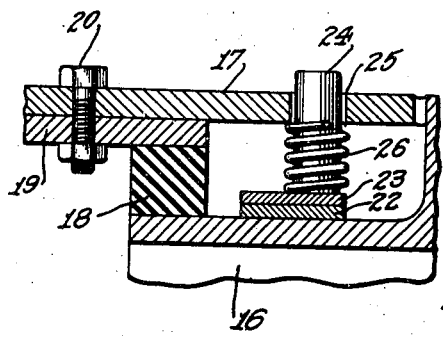
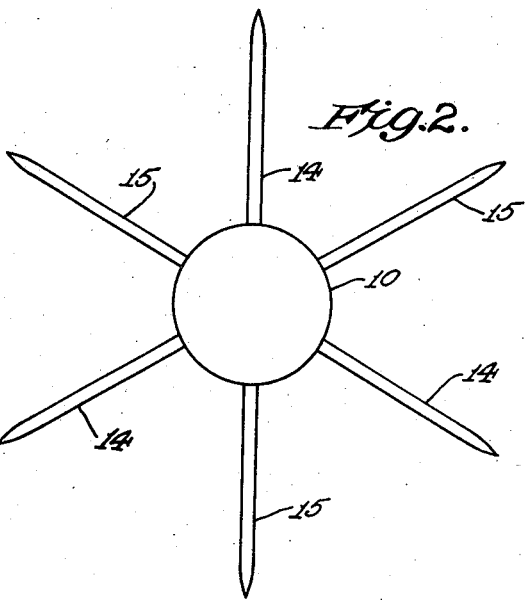
INVENTORS
CHARLES M. KEARNS JR.
WALTER E. ARNOLDI
BY
ATTORNEY Patented May 4, 1948

2,440,956

UNITED STATES PATENT OFFICE 2,440,956

VIBRATION DAMPENING MEANS FOR MULTIBLADE AIRCRAFT PROPELLERS

Charles M. Kearns, Jr., Manchester, and Walter E. Arnoldi, Wethersfield, Conn., assignors to United Aircraft Corporation, East Hartford, Conn., a corporation of Delaware Application September 21, 1945, Serial No. 617,718

8 Claims. (Cl. 170—165)

1

This invention relates to multi-blade aircraft propellers having a plurality of coaxial hubs and it has for its object to minimize or suppress deleterious vibrations which are peculiar to propellers of this type.

Another object of the invention is to provide a single rotation multi-blade propeller of the above type having novel and improved means for controlling the reactionless type of vibratory mode between the hub structures.

Various other objects and advantages will be apparent as the nature of the invention is more fully disclosed.

The invention is applicable to single-rotating aircraft propellers having four or more blades mounted on a plurality of axially aligned hubs with the tandem rows of blades arranged either in line or staggered, according to aerodynamic requirements.

The reactionless type of vibratory mode occurring in propellers of the above type is of such character that the vibratory shear forces and bending moments from each blade are equally opposed by the vector sum of the respective reactions of the other blades so that no external vibratory forces are necessary to hold the hub in equilibrium. Reactionless modes can only occur in propellers having more than three blades and the excitation is aerodynamic in origin. In a reactionless mode large forces are transmitted from one blade to another by the hub structure.

According to the present invention we provide the hub structure of a propeller of the foregoing type with means for extracting vibratory energy from the vibratory forces transmitted through the hub. Flexible coupling means are provided so that these forces produce motions, and frictional damping means associated with the hub structure accomplish the damping.

A two-bladed or three-bladed propeller hub has a set of reactions comprising a thrust oscillation, a torque oscillation, a lateral or vertical force oscillation, or a pitching or yawing moment oscillation. The flexibility and damping means connecting the plurality of axially arranged two or three-bladed hubs should be effective on at least one, and preferably all, of these types of reaction. The structure disclosed herein for the purpose of illustrating the present invention is applicable to all types.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

In the drawing:

Figure 1 is a perspective view, partly in section, of a single rotation propeller having coaxial multi-bladed hubs, embodying the present invention;

Fig. 2 is a diagrammatic front elevation of the propeller, showing the staggered arrangement of the blades; and Fig. 3 is a longitudinal sectional view, on an enlarged scale, through one of the damping means between the dual propeller hubs of Fig. 1.

In the following description certain specific terms are used for convenience in referring to the various details of the invention. These terms, however, are to be interpreted as broadly as the state of the art will permit.

The propeller shown in Figs. 1 and 2 comprises a pair of axially aligned hubs 10 and 12 mounted on a common propeller shaft 13 and carrying three uniformly spaced propeller blades 14 and 15, respectively.

Fig. 1 now illustrates more or less diagrammatically an internal construction for the hub 10, it being understood that the hub 12 may be similarly constructed. This internal construction as shown follows more or less standard practice including the use of one or more annular, wedge-shaped members, one of which is shown at 30, for holding the internal hub part 31 of the hub 10 against axial movement on the shaft 13. To prevent rotative movement of the hub part 31 about the axis of the shaft, suitable spline means as diagrammatically illustrated at 32 may be provided. A suitable nut 33 may be threaded on the shaft 13 to prevent the axial movement of the hub part 31 along the shaft as seen in Fig. 1. The use of annular wedge-shaped members, splines and threaded nut means is conventional in the art and is shown, for example, in the patent to Martin No. 2,144,428, granted January 17, 1939.

In the construction as particularly illustrated in Fig. 1, the only direct connection between the outer hub part 34 of the hub 10 and the inner part 31 thereof is through hub extensions substantially concentric with the respective blades 14, one of which extensions is shown at 35, so that the hub part 34 may be said to float on the several extensions 35. These extensions connect to parts inside the blades respectively, for example, as shown in the patent to Tyler No.

2,112,797, granted March 29, 1938. This patent further shows a conventional spline connection between the central hub part and the shaft upon which that hub is mounted.

While other types of construction could obviously be used, and are intended to be included within the purview of the present invention, that shown is selected as a known construction based upon prior art specifically shown in issued patents owned by the owners of the present application. In the embodiment illustrated, the tandem sets of blades 14 and 15 are mounted in staggered relation, as best shown in Fig. 2. The hubs 10 and 12, and consequently the two sets of blades 14 and 15, rotate in unison in the same direction.

The adjacent ends of the propeller hubs 10 and 12 have concentric annular walls or flanges 16 and 17, respectively, which telescope one within the other as shown in Figs. 1 and 3.

The axial vibration damping means, best shown in Fig. 3, includes a flexible coupling shown as comprising a rubber or other resilient band or ring 18 bonded to an annular plate 19 which is secured as by bolts 20 to the under side of the flange 17 of hub 12, the said ring 18 frictionally engaging the annular flange 16 of hub 10; and a plurality of spaced arcuate frictional damping pads or shoes 22 likewise contacting the surface of said flange 16 and each bonded to an arcuate plate 23 having a pin or lug 24 which is loosely seated in a hole 25 in the annular flange 17 of hub 12. Resilient means, such as coil springs 26 surrounding the several lugs 24 and compressed between the flange 17 and the arcuate plate 23, urge the damping shoes 22 into frictional engagement with the flange 16 of hub 10. Three or more damping members are preferably provided in an installation of the type illustrated.

The flexible coupling and damping means described above effectively extracts vibratory energy from the vibratory forces transmitted through the hub, with the result that deleterious vibrations peculiar to this type of propeller are suppressed or greatly reduced.

Although a specific embodiment has been shown and described herein for purposes of illustration, it will be evident to those skilled in the art that the invention is capable of various modifications and adaptations within the scope of the appended claims.

What is claimed is:

1. A propeller comprising a pair of axially aligned hubs mounted on a common shaft adjacent to each other and rotatable in unison in the same direction, a plurality of propeller blades carried by each of said hubs, members on the adjacent ends of said hubs spaced radially outwardly a substantial distance from the axis of said shaft and telescoping one within the other, and resilient vibration absorbing and damping means supported by one of said members and bearing upon the other of said members.

2. A propeller comprising a pair of axially aligned hubs mounted on a common shaft adjacent to each other and rotatable in unison in the same direction, a plurality of propeller blades carried by each of said hubs, concentric annular flanges on the adjacent ends of said hubs spaced radially outwardly a substantial distance from the axis of said shaft and telescoping one within the other, and resiliently mounted vibration absorbing and damping means supported by one of said flanges and bearing upon the other.

3. A propeller comprising a pair of axially aligned hubs mounted on a common shaft adjacent to each other and rotatable in unison in the same direction, a plurality of propeller blades carried by each of said hubs, concentric annular flanges on the adjacent ends of said hubs spaced radially outwardly a substantial distance from the axis of said shaft and telescoping one within the other, and resilient vibration damping means physically interposed between said hubs including a resilient means supported by one of said flanges and engaging the other flange, and a separate and distinct frictional damping member mounted on one of said flanges and resiliently engaging the other flange.

4. A propeller comprising a pair of axially aligned hubs mounted on a common shaft adjacent to each other and rotatable in unison in the same direction, a plurality of propeller blades carried by each of said hubs, concentric annular flanges on the adjacent ends of said hubs spaced radially outwardly a substantial distance from the axis of said shaft and telescoping one within the other, and vibration damping means between said hubs including an annular band of resilient material supported by one of said flanges and engaging the other flange, and a plurality of spaced arcuate frictional damping shoes movably mounted on one of said flanges and resiliently engaging the other flange.

5. A propeller comprising a pair of axially aligned hubs mounted on a common shaft adjacent to each other and rotatable in unison in the same direction, a plurality of propeller blades carried by each of said hubs in staggered relation to the blades of the other hub, concentric annular flanges on the adjacent ends of said hubs spaced radially outwardly a substantial distance from the axis of said shaft and telescoping one within the other, and vibration damping means between said hubs including an annular band of resilient material supported by one of said flanges and engaging the other flange, and a plurality of spaced arcuate frictional damping shoes movably mounted on one of said flanges and resiliently pressed into frictional engagement with the other flange.

6. A propeller, comprising a pair of axially aligned hubs mounted on a common shaft adjacent to one another, rotatable in unison and in the same direction, and having a restricted relative movement in respect to one another incident to the mounting thereof, a plurality of propeller blades carried by each of said hubs, at least one projecting portion on each of said hubs substantially radially aligned with one another respectively, and frictional means supported by one of said respective projecting portions and bearing on the other of said projecting portions for damping vibrations incident to the relative movement of said hubs.

7. A propeller, comprising a pair of axially aligned hubs mounted on a common shaft adjacent to one another, rotatable in unison and in the same direction, and having a restricted relative axial movement in respect to one another incident to the mounting thereof, a plurality of propeller blades carried by each of said hubs, concentric annular flanges on adjacent ends of said hubs telescoping one within the other, and at least one frictional member mounted on one of said flanges and bearing on the other thereof for damping vibrations therebetween incident to the relative movement of said hubs.

8. A propeller, comprising a pair of axially aligned hubs mounted on a common shaft adjacent to one another, rotatable in unison and in the same direction, and having a restricted relative axial movement in respect to one another incident to the mounting thereof, a plurality of propeller blades carried by each of said hubs, concentric annular flanges on the adjacent ends of said hubs telescoping one within the other, and a plurality of spaced arcuate frictional damping shoes supported on one of said flanges and resiliently pressed into frictional contact with the other thereof for damping vibrations incident to the relative movement of said hubs.

CHARLES M. KEARNS, Jr.
    WALTER E. ARNOLDI.

REFERENCES CITED

The following references are of record in the file of this patent:

UNITED STATES PATENTS

| Number | Name | Date |
| --- | --- | --- |
| 1,485,788 | Lamwers | Mar. 4, 1924 |
| 2,153,523 | Roberts et al. | Apr. 4, 1939 |
| 2,236,139 | Hutchison | Mar. 25, 1941 |
| 2,340,133 | Martin | Jan. 25, 1944 |
| 2,350,942 | Tarn | June 6, 1944 |